United States Patent [19]

Uchytil et al.

[11] 4,055,840
[45] Oct. 25, 1977

[54] REUSABLE SAFETY WARNING DEVICE

[76] Inventors: Anton R. Uchytil, 4265 NE. Halsey, Apt. 212, Portland, Oreg. 97213; Ray L. Gorder, 10 SW. Ash, Portland, Oreg. 97204

[21] Appl. No.: 662,713

[22] Filed: Mar. 1, 1976

[51] Int. Cl.$^2$ .............................................. G08C 5/00
[52] U.S. Cl. ................... 340/321; 116/63 P; 366/32; 366/202; 350/101; 340/90; 340/116; 404/9
[58] Field of Search ............... 340/321, 114 R, 116, 340/90; 240/1 LP, 10.66, 6.4 R, 10; 116/63 P; 313/113; D48/31; D10/111; 404/9; 40/125 N, 129 A, 129 C; 272/8 P, 15; 74/551.8; 343/18 B; 350/97, 98, 101

[56] References Cited

U.S. PATENT DOCUMENTS

| | | | |
|---|---|---|---|
| 2,508,812 | 5/1950 | Burger | 74/551.8 |
| 2,662,968 | 12/1953 | Saraber | 240/1.3 |
| 2,887,983 | 5/1954 | Budd | 116/63 P |
| 3,291,096 | 12/1966 | Walter | 116/63 P |
| 3,471,849 | 10/1969 | Cheng | 340/321 |
| 3,782,322 | 1/1974 | Wilson | 116/63 P |
| 3,823,384 | 7/1974 | Messmer et al. | 340/114 B |
| 3,878,503 | 4/1975 | Martin | 240/1 LP |
| 3,890,497 | 6/1975 | Rush | 240/1 LP |
| 3,930,227 | 12/1975 | Gof | 340/114 R |

Primary Examiner—John W. Caldwell, Sr.
Assistant Examiner—James J. Groody
Attorney, Agent, or Firm—Chernoff & Vilhauer

[57] ABSTRACT

A reusable safety warning device. A plurality of reflective strips of flexible material are adapted to protrude outwardly from an end of an elongate cylindrical body member and droop down to form a pompon-like reflector. A battery-powered light source is disposed within the reflector to radiate light which is reflected off of the flexible strips so that the device resembles a burning incendiary flare. Means are provided for retracting the reflective strips and light source inside the elongate body for storage of the device, and the device is provided with a pair of retractable legs for supporting the reflector end of the body above a surface when in use.

9 Claims, 5 Drawing Figures

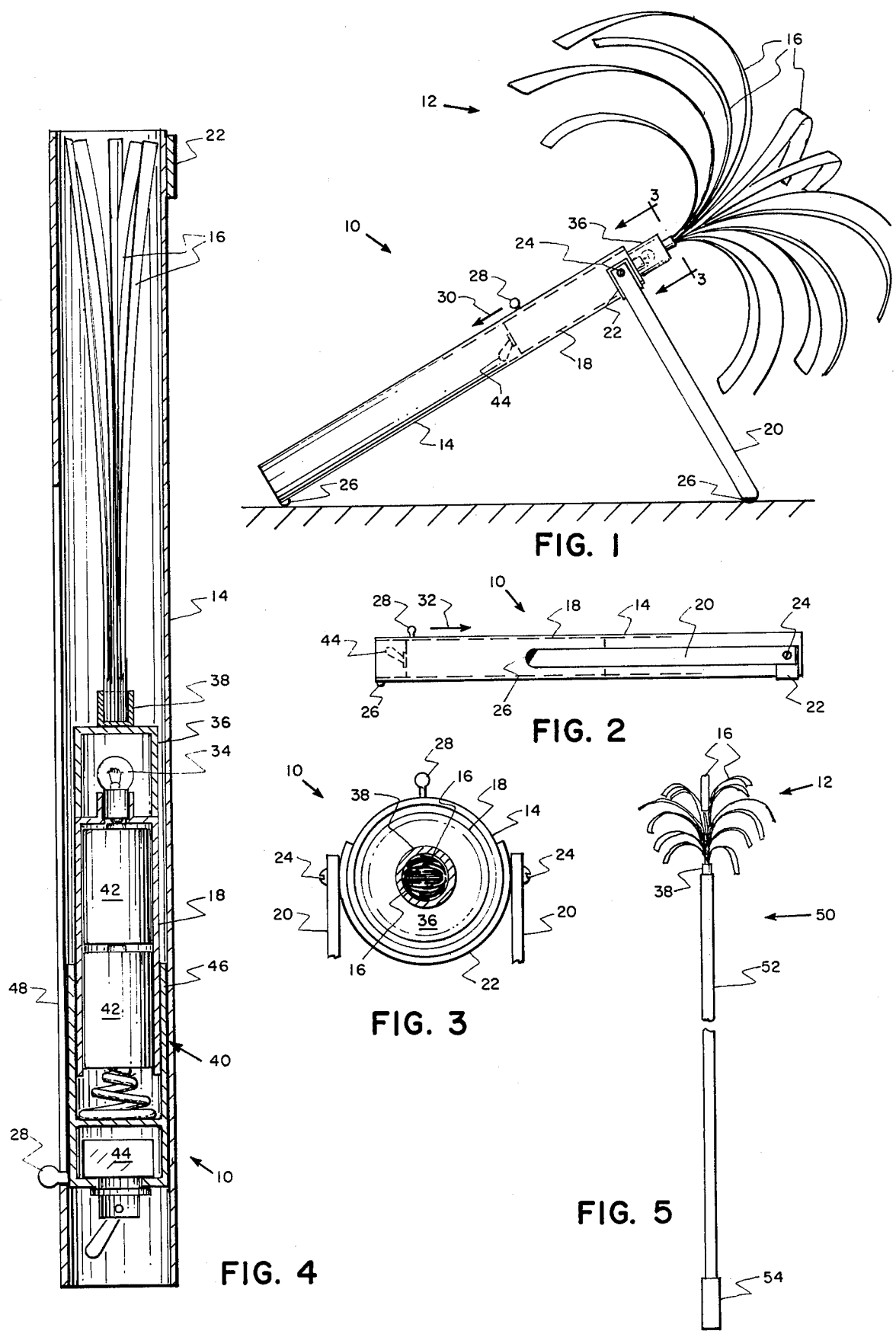

REUSABLE SAFETY WARNING DEVICE

BACKGROUND OF THE INVENTION

This invention relates to reusable safety warning devices, particularly reusable devices which may be effectively used to replace a conventional incendiary flare.

On many occasions, particularly in the case of an automobile breakdown or accident, it is extremely desirable to have available a highly visible warning device to attract others for help and, especially along a highway, to warn others of the presence of stopped vehicles or people so that they will not collide therewith and cause further damage or injury. One of the best such warning devices frequently used is the conventional incendiary flare since it is portable and light, and burns with a very bright light that is easy to see from long distances away.

However, incendiary flares present several problems. First, they will not ignite when wet, and once ignited are consumed by their use. Since such flares are burning when in use, and therefore are hot, they cannot be hand held or placed on objects which may ignite or be damaged by the flame. Thus, incendiary flares are particularly dangerous around automobile and truck accidents where gasoline and other flamables may have spilled. In addition, since the flares are hot their remains are frequently left behind following a vehicle accident or breakdown thereby presenting a hazard for other vehicles.

Several devices have been designed for warning drivers of roadway hazards without the use of an incendiary flare. For example, Asbury U.S. Pat. 3,016,035 shows a flag attached by a pole to a base shaped somewhat like a section of a sphere for supporting the pole upright on the ground. Similarly, Levy et al U.S. Pat. 3,250,241 discloses an inflatable balloon-like emergency signal which is attached to a pole having a suction cup at one end for mounting the device on various objects. However, both of these devices are limited in their ability to attract the attention of an oncoming driver since they do not provide their own source of light, do not provide many reflective surfaces, and do not exhibit sufficient motion to attract much attention, at least without a relatively strong wind. Also, neither is as readily recognizable a danger as a conventional burning incendiary flare.

Another approach which has been taken to provide a reusable warning device is shown in Walter U.S. Pat. No. 3,291,096 wherein a plurality of elongate resilient fingers are attached to a base to protrude outwardly and upwardly therefrom. The base is held down to a surface by a weighted anchor and the entire signal is stored in a multiple-part collapsible container. However, the number of reflective surfaces provided by such finger-like members and motion exhibited thereby are relatively limited since the fingers must be large and rigid to support themselves upright. More importantly, such a signal is difficult to erect and to keep intact, since it requires the separation of numerous parts which may be lost, and it does not provide its own source of light in the darkness.

Therefore it can be seen that there is a need for a reusable warning signal device which may be substituted for the conventional incendiary flare, wherein the device is easily recognizable as a warning signal due to its own source of light, or its ability to reflect a great deal of external light in an attractive manner, and which may more readily be erected than prior art warning devices.

SUMMARY OF THE INVENTION

The present invention overcomes the aforementioned drawbacks of prior art warning devices by providing a reusable warning device utilizing an elongate cylindrical body having a plurality of reflective, streamer-like flexible strips of material protruding divergently from one end thereof and drooping downwardly in the shape of a pompon. The pompon streamers, which create a multitude of reflective surfaces, easily catch a wind, or the breeze of passing cars when the apparatus is erected alongside a highway, such that they move around rapidly thereby reflecting light in a myriad of directions in scintillating fashion to attract the attention of an observer. A light source, preferably having a red color, is disposed at the streamer end of the body surrounded by the drooping ends of the streamers to generate light which shines on the streamers. When the internal light is activated the overall effect of the combination of an elongate body, pompon-type streamers and a red light source is to produce a warning signal closely resembling a conventional burning incendiary flare since the scintillating red light of the signal is the same as a conventional flare. Moreover, when the signal's light is turned off the streamers will nevertheless glitter with the reflection of external lights, such as those of oncoming vehicles, to attract the attention of an observer.

This novel warning signal device is provided with an integrated structure having an electric lightbulb as an internal light source, a portable battery unit inside the elongate body for powering the lightbulb, retractable means for supporting the streamer end of the body above a surface, for example the ground, and a mechanism for retracting the light and streamers inside the body for storage. Thus, the entire signal may be reduced to an essentially cylindrical container and stored in the trunk of a car, on a bicycle or any other convenient location. Alternatively, the pompon reflector, without an internal light source, may be fixedly attached to the end of an elongate, solid, flexible rod for mounting upright on an object such as a bicycle as a warning reflector.

It is therefore a principal objective of the present invention to provide a novel and useful reusable warning signal device.

It is another objective of the present invention to provide such a warning signal which contains its own internal light source and resembles a conventional incendiary flare.

It is yet another objective of the present invention to provide such a warning signal whose parts are integrated into a single reusable package.

It is a principal feature of the present invention that it utilizes an elongate body having a plurality of flexible, reflective streamers protruding from one end thereof in the shape of a pompon.

It is a further feature of the present invention that it may be provided with means for retracting its reflective streamers inside its elongate body.

It is yet another principal feature of the present invention that it utilizes a light source disposed inside the drooping ends of the streamers such that the apparatus resembles a conventional burning incendiary flare when the light source is actuated.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is a side view of the reusable safety warning device of the present invention in an operable configuration.

FIG. 2 is a side view of the warning device of the present invention in its storage configuration.

FIG. 3 is an end-section view of the aforementioned warning device taken along line 3—3 of FIG. 1.

FIG. 4 is a side-section view of the aforementioned warning device in its storage configuration.

FIG. 5 is a side view of an alternative embodiment of the warning device of the present invention.

DETAILED DESCRIPTION OF THE INVENTION

Referring to FIG. 1, the preferred embodiment of the reusable safety warning device 10 of the present invention comprises essentially a pompon-type reflector 12 attached to an elongate, tubular body 14 to protrude outwardly from one end thereof in the operable configuration of the warning device. The reflector 12 is made from a plurality of streamers 16 comprising shiny strips of relatively thin flexible, glossy reflective material, for example silvered mylar, which may be cut to various lengths and widths, attached to an end of a slidable core 18. The streamers protrude divergently from the end of the body and their protruding ends droop downwardly under the force of gravity, producing a pompon-like shape and providing a myriad of reflective surfaces.

It is preferred to provide the safety device 10 with a pair of pivotally-mounted legs 20 attached thereto by, for example, a U-shaped member 22 having pivot joints 24 for mounting the legs. These legs enable the flare to be set upright on a surface such as the ground, thereby keeping the reflective streamers 16 above the surface and enabling them to move around with the slightest breeze, as shown in FIG. 1. To protect surfaces, such as the top of a car, upon which the flare may be placed, and to resist movement of the device body 14, the device is provided with a plurality of rubber skids 26 placed respectively at the unsupported end of the elongate body 14 and on the bottom ends of the legs 20. The legs may be pivoted about points 24 to a position parallel with the elongate body 14 when not needed, as shown in FIG. 2. It should be recognized that while this structure for supporting the safety device is preferred, other structures might be utilized without departing from the principles of this invention.

When the safety device 10 is not in use, the slidable core 18 may be moved rearwardly in the body 14 using a slider pin 28, as shown by arrow 30, thereby retracting the mylar strips 16 rearwardly into the tubular core and eliminating the pompon effect, as shown in FIG. 2. In this configuration the device may be conveniently stored in the trunk of a car, under a car seat, on a bicycle, in a pack or in any other convenient location for access by persons needing to produce a warning signal. When use of the device is again needed, the pompon reflector may again be placed in an operational position by moving the slider pin 28 forwardly, as shown by arrow 32. The legs 20 may then be pivoted downwardly to hold the reflector end of the device upright, or the body of the device may be set on a support, or in a container, or otherwise placed in a position where the streamers of the pompon reflector are free to move about and reflect light.

While the moving reflective streamers 16 provide adequate warning in many instances by reflecting the light from the headlights of oncoming cars, from nearby streetlamps, or other external sources, the device preferably is provided with an internal battery-powered light source, for example a lightbulb 34 mounted inside a clear shield 36, for generating light which will be reflected off of the streamers thereby greatly increasing the capability of the safety device to produce a warning signal. Preferably the light produced by the lightbulb and shield is red light thereby causing the device closely to resemble a conventional incendiary flare, particularly due to the scintillating effect produced by reflection of the light off of the moving streamers, giving rise to a greater degree of warning to observers. The flexible streamers 16 should be attached to the core 18 such that light may reflect off of them as they move. In a preferred arrangement shown in FIGS. 3 and 4, the streamers 16 are bound together at one end and secured in a sleeve 38, for example by crimping, and attached to the end of the shield 36 by some conventional means, such as glue; however, it is recognized that other arrangements for attaching the streamers to the core might be utilized to enable the light to reflect off of the streamers.

Turning now to FIG. 4, the slidable core 18 includes a power unit 40 for holding batteries 42 to operate the lightbulb 34. The power unit should also be provided with a means for turning the lightbulb on and off, such as a toggle switch 44, or an automatic switch which is actuated upon sliding the power unit forwardly, and appropriate electrical conductors (not shown) for connecting the lightbulb to the switch and batteries, as is commonly known to the art. The power unit should also be provided with a detachable joint 46 or similar means, for removing the batteries and lightbulb. Preferably the slidable core should be made of strong plastic to reduce the cost of manufacture, the shield being made of clear plastic, but other materials such as metal which could also serve as an electrical conductor may be suitable. The elongate tubular body 14 should preferably be cylindrical, be provided with a slot 48 in its side for moving the slider pin 28, and be painted red to resemble a conventional incendiary flare. It may also include a notch for receiving the pin 28, or some other latch mechanism, at the top end of the slot 48 for holding the slidable core in its operable position.

Another embodiment of the invention 50, shown in FIG. 5, utilizes only the pompon reflector portion 12 of the warning device attached to the top of an elongate rod 52. A mounting means 54, such as a clamp, may be provided near the bottom end of the rod for attaching it to various objects. It is contemplated that this embodiment would primarily be mounted on a bicycle or placed upright in the ground to reflect external light. However, it could also be provided with the retraction and light generation features of the aforementioned preferred embodiment. When used on a bicycle the rod should be made of a relatively flexible material to increase the amount of movement of the pompon reflector and thereby increase its capability of attracting attention.

The terms and expressions which have been employed in the foregoing abstract and specification are used therein as terms of description and not of limitation, and there is no intention of the use of such terms and expressions of excluding equivalents of the features shown and described or portions thereof, it being recognized that the scope of the invention is defined and limited only by the claims which follow.

What is claimed is:

1. A reusable safety warning device, comprising an elongate tubular body member, a plurality of thin, streamer-like, flexible shiny strips of glossy reflective material attached to said body member and adapted to protrude longitudinally outward from one end thereof for a first portion of their respective lengths, diverge from one another in a plurality of directions for a second portion of their respective lengths and then droop at their protruding ends under the force of gravity so as to produce a pompon-like array of said strips, and means partially disposed within said body member for retracting said flexible strips into said body member.

2. The warning device of claim 1 wherein said retracting means comprises a slidable core disposed within said tubular body member and adapted to be selectively moved within said body member along its longitudinal dimension, said flexible strips being attached to said slidable core so that moving said core away from the end of protrusion of said strips pulls said strips into said tubular body.

3. The warning device of claim 2 wherein said slidable core includes a light source for producing light to be reflected off of said flexible strips.

4. The warning device of claim 2 wherein said flexible strips are bound together at one end thereof and attached to an end of said slidable core.

5. The warning device of claim 1 further comprising light source means adapted to protrude from the same end of said body member as said flexible strips, for producing light to be reflected off of said strips, said strips being attached to the end of said light source means adapted for protrusion.

6. The warning device of claim 5 wherein said light source means comprises an electric light and said warning device further comprises a portable electric power source disposed within said body member.

7. The warning device of claim 5 wherein said flexible strips are adapted to droop downwardly around the exterior of said light source means under the force of gravity so that light from said light source means may reflect off of said strips.

8. The warning device of claim 1 further comprising support means attached to said body member for holding said flexible strips above a surface.

9. The warning device of claim 8 where said support means comprises a pair of legs retractably attached to the end of said body member from which said flexible strips protrude.

* * * * *